United States Patent
Hegyi et al.

(10) Patent No.: US 12,240,420 B2
(45) Date of Patent: Mar. 4, 2025

(54) WIPER DEVICE, SENSOR SYSTEM, AND VEHICLE

(71) Applicant: Robert Bosch GmbH, Stuttgart (DE)

(72) Inventors: Akos Hegyi, Mezöhegyes (HU); Bence Balint, Delegyhaza (HU); Janos Simonovics, Pecs (HU); Mate Hornyak, Pakozd (HU); Mihaly Nagy, Törökbálint (HU); Peter Deak, Budapest (HU); Peter Kosaras, Budapest (HU); Zoltan Varga, Kecskemet (HU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/851,491

(22) Filed: Jun. 28, 2022

(65) Prior Publication Data

US 2022/0410845 A1     Dec. 29, 2022

(30) Foreign Application Priority Data

Jun. 29, 2021    (DE) .......................... 102021206727.1

(51) Int. Cl.
    *B60S 1/56*        (2006.01)
    *B60S 1/34*        (2006.01)
    (Continued)

(52) U.S. Cl.
    CPC ................. *B60S 1/566* (2013.01); *B60S 1/34* (2013.01); *B60S 1/3418* (2013.01);
    (Continued)

(58) Field of Classification Search
    CPC .......... B60S 1/566; B60S 1/3404; B60S 1/34; B60S 1/3484; B60S 1/3418; B60S 1/36;
    (Continued)

(56) References Cited

U.S. PATENT DOCUMENTS

| | | | | |
|---|---|---|---|---|
| 1,476,174 A | * | 12/1923 | Parker .................. | B60S 1/3404 74/57 |
| 1,662,244 A | * | 3/1928 | Folberth et al. ...... | B60S 1/3427 15/250.34 |

(Continued)

FOREIGN PATENT DOCUMENTS

| | | | |
|---|---|---|---|
| DE | 102010042047 | * | 4/2012 |
| EP | 3838691 | * | 6/2021 |
| FR | 3103764 A1 | | 6/2021 |
| WO | 2020001593 | * | 1/2020 |

OTHER PUBLICATIONS

Machine translation of description portion of German publication 102010042047, published Apr. 2012. (Year: 2012).*
Machine translation of description portion of WO publication 2020/001593, published Jan. 2020. (Year: 2020).*

*Primary Examiner* — Gary K. Graham
(74) *Attorney, Agent, or Firm* — Michael Best & Friedrich LLP (57) ABSTRACT

A wiper device having a wiper arm (20a; 20b; 20c), having at least one wiper blade (18a, 18a', 18a") which is coupled to the wiper arm (20a; 20b; 20c), which includes at least one wiper lip (22a, 22a', 22a") for wiping a surface (16a; 16b; 16c) of a protective element (14a; 14b; 14c) of a sensor device (12a), in particular of a Lidar device, and having a wiper arm guide unit (24a) which is provided for moving the wiper arm (20a; 20b; 20c) in an at least substantially translatory manner along a guide path (50a). It is proposed that the wiper device has a rotary joint (26a) by means of which the wiper blade (18a, 18a', 18a") is pivotably mounted on the wiper arm (20a; 20b; 20c).

15 Claims, 9 Drawing Sheets

(51) Int. Cl.
*B60S 1/36* (2006.01)
*B60S 1/40* (2006.01)
*G01S 7/497* (2006.01)

(52) U.S. Cl.
CPC ........... *B60S 1/3425* (2013.01); *B60S 1/3463* (2013.01); *B60S 1/36* (2013.01); *B60S 1/56* (2013.01); *B60S 1/3404* (2013.01); *B60S 1/40* (2013.01); *G01S 2007/4977* (2013.01)

(58) Field of Classification Search
CPC ...... B60S 1/3497; B60S 1/3425; B60S 1/345; B60S 1/38; B60S 1/40
USPC .......... 15/250.34, 250.29, 250.351, 250.352, 15/250.39, 250.43, 250.24
See application file for complete search history.

(56) References Cited

U.S. PATENT DOCUMENTS

| | | | | |
|---|---|---|---|---|
| 3,052,492 | A * | 9/1962 | Schmitz | B60S 1/3418 403/93 |
| 3,780,394 | A * | 12/1973 | Quinlan | B60S 1/38 15/250.43 |
| 5,446,586 | A * | 8/1995 | Dornier | B60S 1/16 359/507 |
| 7,581,279 | B2 * | 9/2009 | Baseotto | B60S 1/32 15/250.43 |
| 8,201,301 | B2 * | 6/2012 | Jeong | B60S 1/3882 15/250.361 |
| 2016/0347284 | A1 * | 12/2016 | Hauser | B60S 1/345 |
| 2017/0369039 | A1 * | 12/2017 | Rousseau | B60S 1/3404 |

\* cited by examiner

WIPER DEVICE, SENSOR SYSTEM, AND VEHICLE

CROSS-REFERENCE TO RELATED APPLICATIONS

This application claims priority to DE 102021206727.1, filed Jun. 29, 2021, the entire contents of which are incorporated herein by reference.

BACKGROUND OF THE INVENTION

A wiper device having a wiper arm, having at least one wiper blade which is coupled to the wiper arm, which comprises at least one wiper lip for wiping a surface of a protective element of a sensor device, in particular of a Lidar device, and having a wiper arm guide unit which is provided for moving the wiper arm in an at least substantially translatory manner along a guide path, has already been proposed.

SUMMARY OF THE INVENTION

The invention proceeds from a wiper device having a wiper arm, having at least one wiper blade which is coupled to the wiper arm, which comprises at least one wiper lip for wiping a surface of a protective element of a sensor device, in particular of a Lidar device, and having a wiper arm guide unit which is provided for moving the wiper arm in an at least substantially translatory manner along a guide path.

It is proposed that the wiper device has a rotary joint by means of which the wiper blade is pivotably mounted on the wiper arm.

A "wiper device" is preferably to be understood to mean at least a part, preferably a sub-module, of a screen wiper. The wiper device can preferably also comprise the entire screen wiper, in particular having a wiper blade. The wiper device is preferably provided for use in a vehicle and on the sensor device. The wiper device, in particular as part of the screen wiper, is preferably provided for cleaning a face, preferably a glass of the sensor device on a vehicle. The wiper device is preferably coupled to the vehicle. "Provided" is preferably to be understood to mean specially configured, specified, conceived and/or equipped. An object being provided for a specific function is preferably to be understood to mean that the object fulfils and/or carries out this specific function in at least one state of application and/or operation. An "operating state" is preferably to be understood to mean a state in which the wiper device is operationally ready for a wiping procedure and/or a wiping operation and/or is in a wiping operation in which the wiper lip of the wiper blade, in particular of the screen wiper, is preferably guided across a glass, in particular the surface of the protective element, of the sensor device, and herein advantageously bears on the surface. The surface of the protective element of the sensor device can be configured as part of a vehicle glass of the vehicle. In particular, the protective element can be configured as part of a vehicle glass of the vehicle.

The sensor device is preferably configured as a Lidar device. The sensor device is in particular at least one part, preferably at least one sub-module, of at least one Lidar sensor, in particular of a Lidar sensor module. The sensor device can in particular also comprise the entire Lidar sensor, in particular the entire Lidar sensor module. The sensor device preferably has at least one Lidar unit which comprises in particular at least one Lidar sensor element. In particular, the sensor device can have a multiplicity of, such as for example two, three, four, five, or the like Lidar sensor elements. The sensor device is preferably disposed on a vehicle for detecting the environment, in particular for autonomous driving. The sensor device can be disposed on construction sites for measuring buildings, for scanning 3-D contours and/or for research purposes in the laboratory. The sensor device, particularly by means of the at least one Lidar sensor element, is in particular provided for detecting and/or measuring objects. The sensor device is preferably provided for use on a vehicle. The sensor device is preferably configured as a component of the vehicle. Alternatively, the sensor device can be configured as a retrofit kit for the vehicle. The sensor device is preferably provided for detecting objects in an environment of the vehicle. The sensor device, for detecting objects, is preferably coupled to the vehicle, preferably in a roof region, a front region, at least one lateral region and/or one rear region of the vehicle. The sensor device is preferably connected to the vehicle, in particular to a computer unit such as, for example, a board computer of the vehicle. The sensor device preferably comprises the protective element, in particular an aperture cover which in particular enables a laser beam to exit a housing of the sensor device, and which is in particular at least substantially transparent to detection wavelengths of the laser beam of the at least one Lidar sensor element. The protective element is preferably configured as an aperture cover. The protective element, in particular the aperture cover, of the sensor device preferably defines the surface of the sensor device as an external surface of the protective element, in particular of the aperture cover. The sensor device, in particular the protective element, preferably the aperture cover, is preferably at least partially disposed on an external side of the vehicle. The protective element, preferably the aperture cover, preferably covers the sensor device at least partially, in particular in relation to the outside. For example, the protective element, preferably the aperture cover, is at least largely configured from glass and/or a plastics material. The wiper blade, in particular by means of the wiper lip, is in particular provided for mechanically cleaning, the protective element, preferably the aperture cover. The wiper lip is preferably configured like rubber.

The wiper arm guide unit preferably has a drive unit which for cleaning the surface moves the wiper blade in a linear manner across the surface. The drive unit is preferably configured for moving the wiper blade along a path that is defined by the wiper arm guide unit. The wiper arm guide unit preferably defines a rectilinear path. The wiper device preferably comprises a connecting unit by means of which the wiper arm and the wiper arm guide unit are releasably connected to one another. The connecting unit is preferably configured as a snap-fit closure. The wiper arm and a carrier element of the wiper arm guide unit, in a completely assembled state, by means of at least one connection means are preferably connected to one another in a force-fitting and/or form-fitting manner. The connection means, proceeding from two sides of the wiper arm that face away from one another, is preferably provided for mutually compressing the wiper arm and the carrier element. The drive unit is preferably configured for moving the wiper blade along the surface over the entire area, in particular for mechanically cleaning the entire area of the surface.

The wiper lip of the wiper blade is preferably configured so as to be replaceable. In particular, the wiper lip of the wiper blade can be configured so as to be replaceable without tools. A "longitudinal axis" of an object is to be understood to mean in particular an axis which runs parallel to a longest edge of a smallest geometric cuboid which just completely encloses the object, and preferably runs through a geometric center of the object.

The drive unit, in particular between operating states of the wiper blade, is preferably configured for moving the wiper blade to a parking position in which the wiper lip for destressing the at least one contact pressure element is in particular pushed by the contact pressure unit up to a detent, and/or in which the wiper lip is disposed so as to be spaced apart from the surface. For example, the surface, in particular the protective element, can be configured so as to taper on at least one side. In particular the protective element, in particular the aperture wall, can have at least one ramp element on at least one side, in particular on at least two, preferably mutually opposite, sides. For wiping from the parking position, the drive unit can be configured for moving the wiper blade by way of the at least one ramp element onto the surface, in particular onto the protective element, for example. For wiping from the surface, the drive unit can be configured for moving the wiper blade from the surface to the parking position by way of the at least one ramp element, for example.

The wiper device preferably comprises exactly one wiper arm. The wiper lip is preferably disposed, in particular largely, in the wiper arm. A longitudinal axis of the at least one wiper arm is preferably aligned so as to be parallel to the at least one surface. A longitudinal axis of the at least one wiper arm is preferably aligned so as to be parallel to an external edge of the at least one surface. The at least one surface is preferably configured so as to be at least substantially rectangular. The at least one wiper arm preferably extends across at least one edge length of the at least one surface. The at least one wiper arm, on at least one end of an extent of the at least one wiper arm along the longitudinal axis of the at least one wiper arm, is preferably connected to the drive unit. Alternatively, the at least one wiper arm, at both ends of the extent of the at least one wiper arm along the longitudinal axis of the at least one wiper arm, can be connected to the drive unit. The at least one wiper arm is preferably configured as an in particular metal strip which, in a cross section perpendicular to the longitudinal axis of the at least one wiper arm, is a U-shaped strip. The at least one wiper arm preferably has a U-shaped profile, in particular in terms of the cross section perpendicular to the longitudinal axis of the at least one wiper arm. The at least one wiper arm is preferably configured so as to be at least substantially cuboid. The at least one wiper arm preferably delimits a wiper cavity, the wiper lip being largely disposed in the latter. An open side, in particular in terms of the U-shaped profile, of the wiper arm is preferably aligned so as to face the surface. The drive unit is preferably fixedly connected to the vehicle or to the sensor device. The at least one wiper arm is preferably fixedly connected to the drive unit. The contact pressure unit is preferably configured for pressing the wiper lip against the at least one wiper arm, in particular against the drive unit, and onto the surface, in particular against the vehicle, in particular against the sensor device. For purposes of regulating the contact pressure, it is conceivable for the wiper device to have a linear guide unit which mounts the wiper lip so as to be movable on the wiper arm.

The wiper blade, by way of the rotary joint, is preferably coupled to the wiper arm so as to be releasable without tools. The wiper blade is preferably connected to the wiper arm exclusively at the rotary joint. The rotary joint preferably mounts the wiper blade so as to be pivotable about a rotation axis on the wiper arm. The rotation axis is preferably aligned so as to be perpendicular to the longitudinal axis of the wiper arm. The rotation axis is preferably aligned so as to be perpendicular to a longitudinal axis of the wiper blade. The rotation axis is preferably aligned so as to be parallel to the surface. The rotation axis is preferably aligned so as to be parallel to at least one external edge of the surface. The rotation axis is preferably aligned so as to be perpendicular to the longitudinal axis of the wiper lip. For example, the rotary joint can comprise a bearing pin which is fixedly connected to the wiper arm. Alternatively, the rotary joint can comprise a clearance into which the wiper blade is able to be hooked. The wiper blade preferably has a form-fit element which has a shape corresponding to that of the bearing pin or of the clearance. The wiper device can have a locking unit which is provided for captively connecting the wiper blade to the wiper arm, said wiper blade being pivotably mounted by way of the rotary joint. The rotary joint is preferably at least largely disposed in the wiper cavity.

Reliable cleaning of the window element can be achieved as a result of the design embodiment of the wiper device according to the invention. Advantageous properties in terms of the reliability of the sensor device to be cleaned can be achieved in particular. An advantageously high safety standard for operating the sensor device for detecting objects can be achieved in particular. Travel of the vehicle can in particular be utilized for an advantageously forceful cleaning of the sensor device.

It is furthermore proposed that the rotary joint, when viewed along a longitudinal axis of the wiper arm, is disposed so as to be at least substantially in a center of the wiper arm. When viewed along the longitudinal axis of the wiper arm, the rotary joint is preferably disposed exactly in a center of the wiper arm. When viewed along the longitudinal axis of the wiper arm, the rotary joint can be disposed about the center of the wiper arm in a range of at most 25%, preferably at most 10%, of the maximum extent of the wiper arm along the longitudinal axis thereof. An advantageously uniform bearing of the wiper lip on the surface can be achieved, wherein the wiper lip can advantageously slide across uneven spots on the surface.

It is furthermore proposed that the wiper device has at least one contact pressure unit having at least one spring element which is provided for generating a contact pressure force for pressing the wiper lip onto the surface of the protective element. The wiper device preferably has the contact pressure unit for pressing the wiper lip onto the surface. For cleaning the surface, the drive unit is preferably configured for moving the wiper blade in a linear, and in particular bi-directional, manner across the surface, in particular wherein the contact pressure unit presses the wiper lip onto the surface. The contact pressure unit preferably has at least one basic contact pressure element. The contact pressure unit, in particular the at least one basic contact pressure element, is preferably configured for exerting a contact pressure force on the wiper lip, in particular for the wiper lip along a longitudinal axis of the wiper lip to bear in a planar manner on the surface. The contact pressure unit, in particular the at least one basic contact pressure element, is preferably configured for exerting a minimum contact pressure force on the wiper lip, in particular for pressing the wiper lip onto the surface at a uniform pressure of at least 10 N/m, preferably of at least 14 N/m, particularly preferably of at least 20 N/m. The contact pressure unit, in particular the spring element, is preferably configured so as to be different from a spring rail. The contact pressure unit is preferably configured for exerting a contact pressure force on the wiper lip, wherein a counterforce on the wiper arm and by the wiper arm is dissipated by way of the drive unit, and in particular by way of the sensor device, onto an object such as, for example, the vehicle or a housing of the sensor device. The contact pressure unit is preferably configured so as to be different from a bar, in particular a metal bar, which, in particular in the unstressed state, has a curved shape such as a spring rail, in particular. The wiper blade can additionally have a spring rail. The contact pressure unit preferably has an adjustment gage which for adjusting the contact pressure force of the wiper lip on the surface is able to be assembled on the wiper arm. The contact pressure unit on a connection between the wiper arm and the drive unit preferably has an adjustment screw which in the direction of a normal to the surface adjustably configures a spacing of the wiper arm from the surface. An advantageous removal of contaminations can be achieved by an advantageously intense wiping performance. In particular, stains which are difficult to release can be removed by a force acting thereon.

It is furthermore proposed that the wiper arm guide unit comprises a carrier element which is coupled to the wiper arm. A guide frame of the wiper arm guide unit is preferably non-releasably connected to the sensor device, in particular to a sensor housing. The carrier element is preferably non-releasably connected to the guide frame. The wiper arm is preferably able to be releasably connected to the carrier element. An advantageously replaceable wiper arm can be achieved. In particular, an advantageous ease of maintenance of the wiper device can be achieved.

It is furthermore proposed that a longitudinal axis of the carrier element is angled so as to be at least substantially perpendicular to a longitudinal axis of the wiper arm, in particular of the wiper lip. The term "substantially perpendicular" here is to be understood to mean in particular an alignment of a direction relative to a reference direction, wherein the direction and the reference direction, in particular when viewed in a projection plane, enclose an angle of 90°, and the angle has a maximum deviation of in particular less than 8°, advantageously less than 5°, and particularly advantageously less than 2°. Alternatively, the longitudinal axis of the carrier element can be angled by at least 30°, preferably at least 45°, particularly preferably at least 60°, and most particularly preferably at least 75°, in relation to a longitudinal axis of the wiper arm, in particular of the wiper lip. An advantageously uncomplicated contact pressure unit for the wiper arm can be combined with the wiper arm guide unit.

It is furthermore proposed that the wiper arm is provided for push-fitting onto the carrier element. For example, the wiper arm may be able to be connected to the carrier element by a plug connection having a snap-fit connection, in particular having a latching connection. Alternatively, the wiper arm may be able to be connected to the carrier element by a plug connection which is secured by a further plug connection of a further securing element. An advantageously secured and releasable connection between the wiper arm and the carrier element can be achieved.

It is furthermore proposed that the wiper arm, in at least one assembled state, by way of an adjustment axis is mounted so as to be displaceable in relation to the carrier element. The adjustment axis is preferably aligned so as to be parallel to the longitudinal axis of the carrier element. The wiper arm, by way of the adjustment screw, is preferably displaceable along the adjustment axis in relation to the surface, in particular in relation to the protective element. An advantageous basic adjustment for a contact pressure force of the wiper lip on the surface can be achieved.

It is furthermore proposed that the adjustment axis is aligned so as to be at least substantially perpendicular to the surface of the protective element. The wiper arm, in a manner perpendicular to the surface, is preferably configured so as to be displaceable completely along the adjustment axis. A spacing of the wiper arm from the surface is preferably adjustable along the adjustment axis by the adjustment screw. An advantageously precise adjustment of the contact pressure can be achieved, wherein the wiper arm has to be moved to an advantageously minor extent.

It is furthermore proposed that the adjustment axis is aligned at an angle between 10 degrees and 80 degrees in relation to the surface of the protective element. The adjustment axis is preferably aligned at an angle of at least 15°, preferably of at least 25°, particularly preferably of at least 35°, most particularly preferably of at least 45°, in relation to the surface of the protective element. The adjustment axis is preferably aligned at an angle of at most 80°, preferably of at most 70°, particularly preferably of at most 60°, most particularly preferably of at most 50°, in relation to the surface of the protective element. An advantageously lateral accessibility to the surface or to the wiper arm can be achieved.

It is furthermore proposed that the wiper arm and the carrier element are coupled to one another by way of a dovetail joint. Alternatively, the wiper arm and the carrier element can be coupled to one another by way of more than one dovetail joint. An advantageously stable, yet releasable, connection between the wiper arm and the carrier element can be achieved.

It is furthermore proposed that the at least one spring element is disposed in the wiper blade. The at least one spring element is preferably disposed in the wiper cavity between the wiper lip and an external wall of the wiper arm that faces away from the surface. An advantageously variable generation of contact pressure can be achieved.

It is furthermore proposed that the wiper arm by way of the at least one spring element is connected to the carrier element. A, in particular the, spring element is preferably connected directly to the wiper arm and to the carrier element, in particular to exert a force on the wiper arm so as to press the wiper arm in the direction of the surface. Advantageously uncomplicated pretensioning of the wiper arm can be achieved directly when connecting the wiper arm to the carrier element.

Moreover proposed is a sensor system, in particular Lidar system, having at least one sensor device, in particular a Lidar device, which comprises a protective element, and having at least one wiper device according to the invention, which is provided for wiping a surface of the protective element.

Moreover proposed is a vehicle having at least one sensor system according to the invention.

The wiper device according to the invention, the sensor system according to the invention and/or the vehicle according to the invention here is/are not intended to be limited to the application and embodiment described above. In particular, the wiper device according to the invention, the sensor system according to the invention and/or the vehicle according to the invention, for meeting a functional mode described herein may have a number of individual elements, components and units differing from a number mentioned herein. In addition, in the ranges of values indicated in this disclosure, values lying within the limits mentioned are also intended to be considered to be disclosed and usable as desired.

BRIEF DESCRIPTION OF THE DRAWINGS

Further advantages are derived from the following description of the drawing. A plurality of exemplary embodiments of the invention are illustrated in the drawing. The drawing, the description and the claims contain numerous features in combination. The person skilled in the art will expediently consider the features also individually and combine said features so as to form expedient further combinations.

In the drawing.

DETAILED DESCRIPTION

Figure 1:
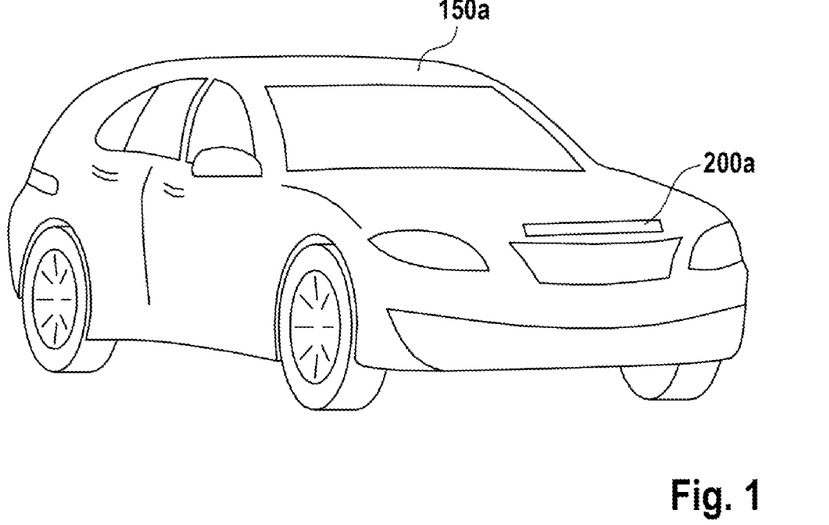
FIG. 1 shows a schematic illustration of a vehicle having a sensor system in a first exemplary embodiment.

FIG. 1 shows a vehicle 150a. The vehicle 150a comprises a sensor system 200a. The sensor system 200a is configured as a Lidar system. The vehicle 150a is configured as a road vehicle, here in an exemplary manner as a passenger motor vehicle.

Figure 2:
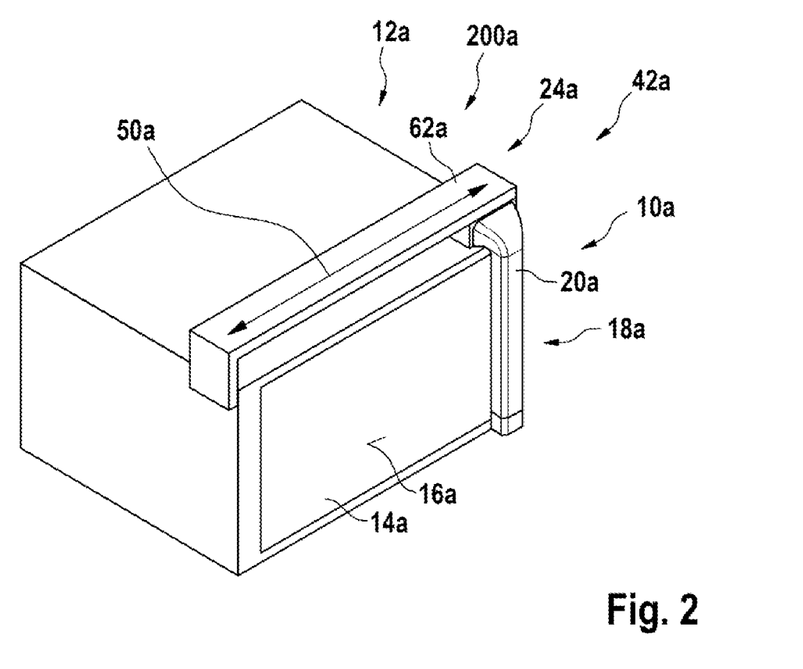
FIG. 2 shows a schematic illustration of the sensor system and of a wiper device according to the invention in the first exemplary embodiment.

FIG. 2 in an abstracted and exemplary manner shows the sensor system 200a. The sensor system 200a has a sensor device 12a. The sensor device 12a is configured as a Lidar device. The sensor device 12a has a protective element 14a.

The sensor system 200a has a wiper device 10a. The wiper device 10a is provided for wiping a surface 16a of the protective element 14a.

Figure 3:
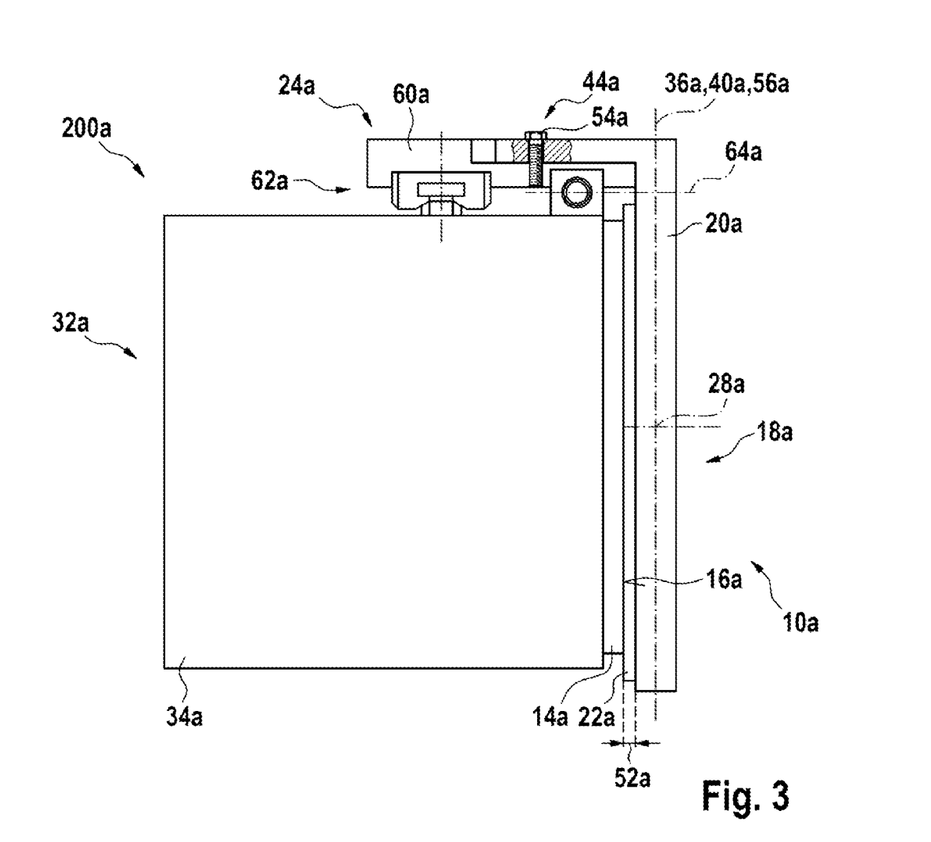
FIG. 3 shows a schematic illustration of the wiper device.

The wiper device 10a comprises a wiper blade 18a, 18a', 18a". The wiper blades 18a, 18a', 18a" shown in FIGS. 4, 5 and 6 correspond to different design embodiments which however are able to be disposed in an analogous manner on the wiper device 10a. The wiper device 10a comprises a wiper arm 20a. The wiper blade 18a, 18a', 18a" has a wiper lip 22a, 22a', 22a" (cf. FIG. 3). The wiper blade 18a, 18a', 18a" is coupled to the wiper arm 20a. The wiper lip 22a, 22a', 22a" is provided for wiping the surface 16a of the protective element 14a of the sensor device 12a, in particular the Lidar device. The wiper lip 22a, 22a', 22a" is coupled to the wiper arm 20a. The wiper device 10a comprises a wiper arm guide unit 24a which is provided for moving the wiper arm 20a in an at least substantially translatory manner along a guide path 50a. The wiper device 10a has a rotary joint 26a by way of which the wiper blade 18a, 18a', 18a" is pivotably mounted on the wiper arm 20a. The wiper arm 20a may be configured in two parts. The wiper arm 20a can be divisible in particular by way of a snap-fit closure. The snap-fit closure is indicated by dashed lines in FIGS. 4, 5 and 6. Here, one part of the wiper arm 20a that is able to be connected to the wiper blade 18a, 18a', 18a" is separable from a further part of the wiper arm 20a that is coupled to the carrier element 60a. A rapid replacement of the wiper blade 18a, 18a', 18a" can take place as a result.

The sensor device 12a is configured as a Lidar device. The sensor device 12a is provided for detecting and/or measuring objects. The sensor device 12a is provided for use on the vehicle 1500a. The sensor device 12a is provided for detecting and/or measuring objects, in particular for autonomous driving. The sensor device 12a is provided for detecting objects in an environment of the vehicle 150a. The sensor device 12a is configured as a component of the vehicle 150a. The sensor device 12a, in particular the protective element 14a, is disposed on an external side of the vehicle 150a. The sensor device 12a has at least one Lidar unit 32a. The Lidar unit 32a has a Lidar sensor element (not shown). The Lidar unit 32a has a sensor housing 34a in which the Lidar sensor element is disposed (cf. FIG. 3). The sensor device 12a has the protective element 14a which enables a laser beam of the sensor device 12a to exit the sensor housing 34a and is in particular transparent to a detection wavelength of the Lidar sensor element. The protective element 14a is configured as an aperture cover. The protective element 14a partially covers the sensor device 12a in relation to the outside. The protective element 14a forms in particular a front part of the sensor housing 34a. The protective element 14a is configured from glass and/or plastics material such as polycarbonate, for example. The protective element 14a defines the surface 16a for the sensor device 12a as an external face of the protective element 14a configured as an aperture cover. The surface 16a is configured so as to be rectangular. The sensor device 12a for data transfer is connected to a computer unit, in particular of the vehicle 150a.

The wiper device 10a is configured for wiping. In particular, the wiper blade 18a, 18a', 18a", in particular by means of the wiper lip 22a, 22a', 22a", is provided for mechanically cleaning the protective element 14a. The wiper lip 22a, 22a', 22a" is configured like rubber. The wiper lip 22a, 22a', 22a" is in particular configured from a natural and/or man-made elastomer. The wiper lip 22a, 22a', 22a" is largely disposed in the wiper arm 20a (cf. FIG. 7). A longitudinal axis 36a of the wiper arm 20a is aligned so as to be parallel to the surface 16a. The wiper arm 20a extends across a shorter edge length of the rectangular surface 16a (cf. FIG. 2). The wiper device 10a comprises exactly one wiper arm 20a. The longitudinal axis 36a of the wiper arm 20a is aligned so as to be parallel to an external edge of the surface 16a. The surface 16a is configured so as to be rectangular. The wiper arm 20a extends across an edge length of the at least one surface 16a.

Figure 7:
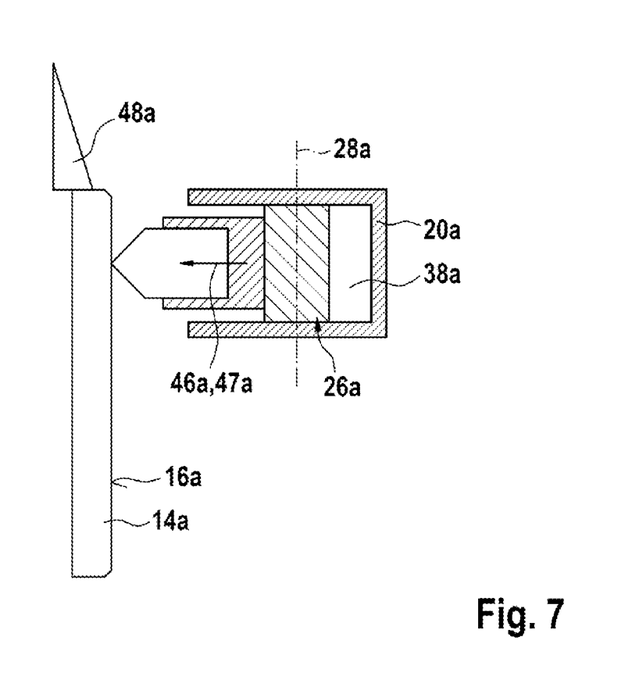
FIG. 7 shows a schematic sectional illustration of the wiper device.

The wiper arm 20a is configured as a metal strip which, in a cross section perpendicular to the longitudinal axis 36a of the wiper arm 20a, is U-shaped (cf. FIG. 7). The wiper arm 20a has a U-shaped profile, in particular in terms of the cross section perpendicular to the longitudinal axis 36a of the wiper arm 20a. An open side, in particular in terms of the U-shaped profile, of the wiper arm 20a is aligned so as to face the surface 16a. A side of the wiper arm 20a that faces away from the surface 16a has in particular a flat external face. In particular, the external face of the side of the wiper arm 20a that faces away from the surface 16a is aligned so as to be parallel to the surface 16a.

The wiper arm 20a is configured so as to be cuboid (cf. FIGS. 1 and 2). The wiper arm 20a limits a wiper cavity 38a in which the wiper lip 22a, 22a', 22a" is largely disposed. The wiper lip 22a, 22a', 22a" is pivotably mounted in the wiper cavity 38a (cf. FIGS. 4 to 6).

The wiper arm guide unit 24a has a drive unit 42a which, for cleaning the surface 16a, moves the wiper blade 18a, 18a', 18a" in a linear manner across the surface 16a. The drive unit 42a is configured for moving the wiper blade 18a, 18a', 18a" along the guide path 50a, the latter being defined by the wiper arm guide unit 24a. The wiper arm guide unit 24a defines a rectilinear path, in particular a rectilinear guide path 50a. The wiper arm 20a is connected to the drive unit 42a. For wiping, the wiper blade 18a, 18a', 18a" is guided across the surface 16a by a drive unit 42a. The drive unit 42a is configured for moving the wiper blade 18a, 18a', 18a" over the entire area along the surface 16a, in particular so as to mechanically clean the entire area of the surface 16a, wherein over the entire area is to be understood to mean in particular that the wiper lip 22a, 22a', 22a" bears along the longitudinal axis 40a of the wiper lip 22a, 22a', 22a". The wiper arm guide unit 24a, in particular the drive unit 42a, is fixedly connected to the sensor system 200a. The sensor system 200a is fixedly connected to the vehicle 150a. The wiper arm 20a, at an end of an extent of the wiper arm 20a along the longitudinal axis 36a of the wiper arm 20a, is connected to the drive unit 42a. For cleaning the surface 16a, the drive unit 42a is configured for moving the wiper blade 18a, 18a', 18a" in a linear, and in particular bi-directional, manner across the surface 16a, wherein a contact pressure unit 44a presses the wiper lip 22a, 22a', 22a" onto the surface 16a (cf. FIG. 3).

The contact pressure unit 44a is partially configured as an adjustment screw 54a on a connection between the wiper arm 20a and the drive unit 42a, said adjustment screw 54a configuring a spacing 52a of the wiper arm 20a from the surface 16a to be adjustable in the direction of a normal of the surface 16a. A basic value for the contact pressure 46a of the wiper lip 22a, 22a', 22a" on the surface 16a is adjustable by the contact pressure unit 44a (cf. FIG. 7). The contact pressure unit 44a, by means of the drive unit 42a, is configured for pressing the wiper lip 22a, 22a', 22a" by way of the wiper arm 20a against the vehicle 150a onto the surface 16a. The contact pressure unit 44a is configured for exerting a contact pressure force 47a on the wiper lip 22a, 22a', 22a", in particular for the wiper lip 22a, 22a', 22a" along a longitudinal axis 40a of the wiper lip 22a, 22a', 22a" to bear in a planar manner on the surface 16a. The wiper device 10a comprises the contact pressure unit 44a. The contact pressure unit 44a is configured for exerting a minimum contact pressure force on the wiper lip 22a, 22a', 22a", in particular for pressing the wiper lip 22a, 22a', 22a" onto the surface 16a, at a uniform pressure of at least 10 N/m, preferably of at least 14 N/m.

The wiper device 10a comprises the contact pressure unit 44a for pressing the wiper lip 22a, 22a', 22a" onto the surface 16.

The contact pressure unit 44a is configured for exerting a contact pressure force 47a on the wiper lip 22a, 22a', 22a", wherein a counterforce on the wiper arm 20a, and from the wiper arm 20a is dissipated by way of the drive unit 42a, and in particular by way of the sensor device 12a, onto an object such as, for example the vehicle 150a, or a housing of the sensor device 12a.

The drive unit 42a is configured for moving the wiper blade 18a, 18a', 18a", in particular between operating states of the wiper blade 18a, 18a', 18a", to a parking position in which the wiper lip 22a, 22a', 22a" is disposed so as to be spaced apart from the surface 16a. The protective element 14a on one side has a ramp element 48a (cf. FIG. 7).

For wiping from the parking position, the drive unit 42a is configured for moving the wiper blade 18a, 18a', 18a" by way of the ramp element 48a onto the surface 16a. For stopping the wiping action of the surface 16a, the drive unit 42a is configured for moving the wiper blade 18a, 18a', 18a" from the surface 16a to the parking position by way of the ramp element 48a.

Figure 4:
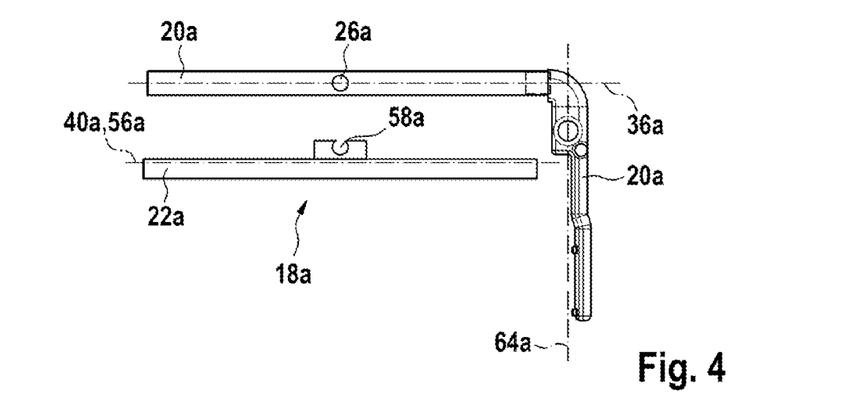
FIG. 4 shows a schematic illustration of a wiper arm of the wiper device.
Figure 5:
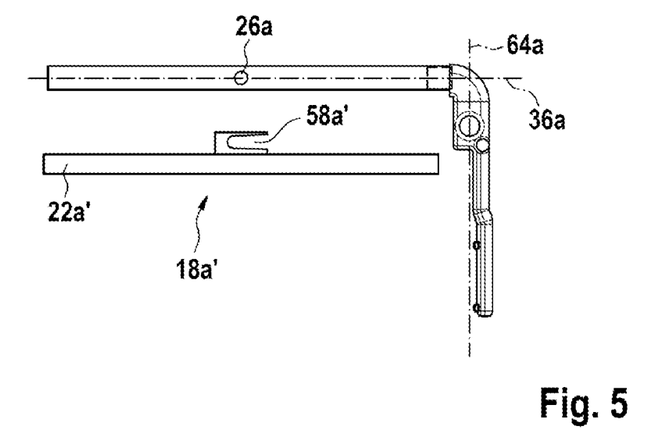
FIG. 5 shows a schematic illustration of an alternative wiper arm of the wiper device.
Figure 6:
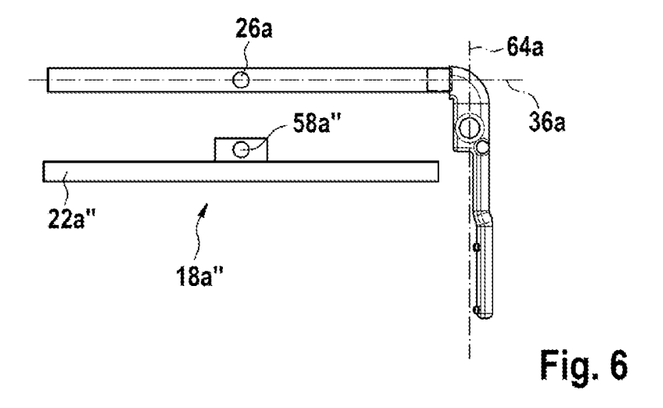
FIG. 6 shows a schematic illustration of a further alternative wiper arm of the wiper device.

The wiper blade 18a, 18a', 18a" is configured so as to be replaceable (cf. FIGS. 4 to 6). In particular, the wiper blade 18a, 18a', 18a" is configured so as to be replaceable without tools. The wiper arm 20a is configured so as to be able to be electrically heated. The side of the wiper arm 20a that faces away from the surface 16a of the protective element 14a is configured so as to be at least substantially rectangular. The side of the wiper arm 20a that faces away from the surface 16a of the protective element 14a is configured so as to be at least substantially flat.

The wiper blade 18a, 18a', 18a" by way of the rotary joint 26a is coupled to the wiper arm 20a so as to be releasable without tools (cf. FIGS. 5 to 6). The wiper blade 18a, 18a', 18a" is connected to the wiper arm 20a exclusively at the rotary joint 26a. The rotary joint 26a mounts the wiper blade 18a, 18a', 18a" on the wiper arm 20a so as to be pivotable about a rotation axis 28a. The rotary joint 26a is configured as a bearing pin. The rotary joint 26a configured as a bearing pin, and when viewed perpendicularly to the longitudinal axis thereof, has a circular cross section. The rotary joint 26a configured as a bearing pin forms the rotation axis 28a. The rotation axis 28a is aligned so as to be perpendicular to the longitudinal axis 36a of the wiper arm 20a.

The rotation axis 28a is aligned so as to be perpendicular to a longitudinal axis 56a of the wiper blade 18a, 18a', 18a". The rotation axis 28a is aligned so as to be parallel to the surface 16a. The rotation axis 28a is aligned so as to be parallel to an external edge of the surface 16a. The rotation axis 28a is aligned so as to be perpendicular to the longitudinal axis 40a of the wiper lip 22a, 22a', 22a".

The wiper blade 18a, 18a', 18a" preferably has a form-fit element 58a, 58a', 58a" which has a shape that corresponds to that of the bearing pin. The form-fit element 58a, 58a', 58a" delimits a clearance for receiving the rotary joint 26a. The form-fit element 58a, 58a', 58a" is centrically connected to the wiper lip 22a, 22a', 22a". The rotary joint 26a is disposed in the wiper cavity 38a.

The rotary joint 26a, when viewed along the longitudinal axis 36a of the wiper arm 20a, is disposed so as to be at least substantially in a center of the wiper arm 20a. The rotary joint 26a, when viewed along the longitudinal axis 36a of the wiper arm 20a, is disposed so as to be exactly in the center of the wiper arm 20a. The rotary joint 26a, when viewed along the longitudinal axis 36a of the wiper arm 20a, is disposed about the center of the wiper arm 20*a* in a range of at most 25% of the maximum extent of the wiper arm 20*a* along the longitudinal axis 36*a* thereof (cf. FIGS. 4 to 6).

The wiper arm guide unit 24*a* has a carrier element 60*a*. The carrier element 60*a* is coupled to the wiper arm 20*a*. A guide frame 62*a* of the wiper arm guide unit 24*a* is non-releasably connected to the sensor device 12*a*, in particular to the sensor housing 34*a*. The carrier element 60*a* is non-releasably connected to the guide frame 62*a*. The carrier element 60*a* is movably mounted by way of the guide frame 62*a*. The wiper arm 20*a* is releasably connected to the carrier element 60*a*.

A longitudinal axis of the carrier element 60*a* is angled so as to be perpendicular to the longitudinal axis 36*a*, 40*a* of the wiper arm 20*a*, in particular of the wiper lip 22*a*, 22*a*', 22*a*". In principle, the longitudinal axis of the carrier element 60*a* could also be disposed at an angle of 30 to 90 degrees in relation to the longitudinal axis 36*a* of the wiper arm 20*a*.

The wiper arm 20*a* is provided for push-fitting onto the carrier element 60*a*. For example, the wiper arm 20*a* is able to be connected to the carrier element 60*a* by a plug connection and/or by way of a snap-fit connection, in particular a latching connection.

The wiper arm 20*a*, in at least one assembled state, by way of an adjustment axis 64*a* is mounted so as to be displaceable in relation to the carrier element 60*a*. The adjustment axis 64*a* is aligned so as to be parallel to the longitudinal axis of the carrier element 60*a*. The wiper arm 20*a*, by way of the adjustment screw 54*a*, is displaceable along the adjustment axis 64*a* in relation to the surface 16*a*, in particular in relation to the protective element 14*a*. The adjustment axis 64*a* is aligned so as to be perpendicular to the surface 16*a* of the protective element 14*a*. The wiper arm 20*a* is configured so as to be completely displaceable along the adjustment axis 64*a* in relation to the surface 16*a*. The spacing 52*a* of the wiper arm 20*a* from the surface 16*a* is adjustable along the adjustment axis 64*a* by the adjustment screw 54*a* (cf. FIG. 3).

Figure 10:
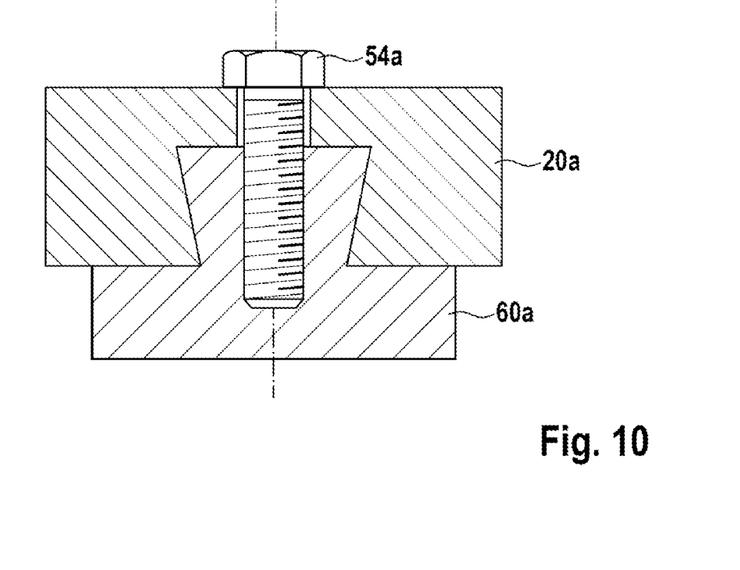
FIG. 10 shows a schematic sectional illustration of a contact pressure unit of the wiper device.

The wiper arm 20*a* and the carrier element 60*a* are coupled to one another by way of a dovetail joint (cf. FIG. 10). The wiper arm 20*a* by way of the dovetail joint is mounted on the carrier element 60*a* so as to have one translatory degree of freedom.

The contact pressure unit 44*a* at a connection between the wiper arm 20*a* and the drive unit 42*a* has the adjustment screw 54*a* which configures a spacing 52*a* of the wiper arm 20*a* from the surface 16*a* to be adjustable in the direction of a normal of the surface 16*a*.

Figure 8:
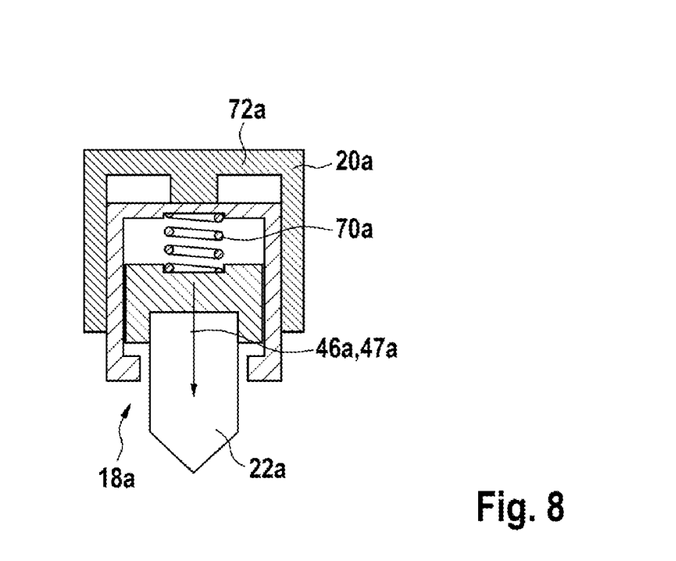
FIG. 8 shows a schematic sectional illustration of the wiper arm.

FIG. 8 shows a cross section of the wiper arm 20*a*. The contact pressure unit 44*a* has a spring element 70*a*. The spring element 70*a* is configured for generating a contact pressure force 47*a* for pressing the wiper lip 22*a* onto the surface 16*a* of the protective element 14*a*. The spring element 70*a* is disposed in the wiper arm 20*a*. The spring element 70*a* is disposed in the wiper blade 18*a*. The wiper blade 18*a* is larger disposed in the wiper arm 20*a*. The spring element 70*a* is disposed in the wiper cavity 38*a* between the wiper lip 22*a* and an external wall 72*a* of the wiper arm 20*a* that faces away from the surface 16*a*. In an alternative design embodiment it would also be conceivable for the wiper blade 18*a* instead of the spring element 70*a* to be at least partially formed from a spring steel, the latter pressing the wiper blade 18*a*, in particular the wiper lip 22*a*, against the surface 16*a*.

Figure 9:
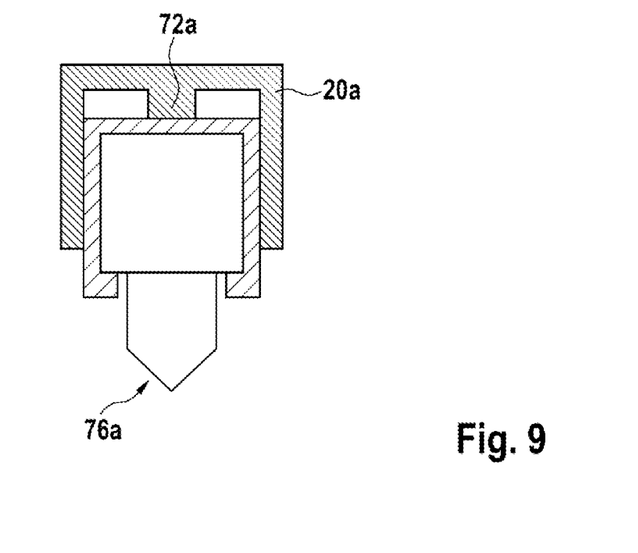
FIG. 9 shows a schematic sectional illustration of an adjustment gage of the wiper device.

The contact pressure unit 44*a* has an adjustment gage 76*a* which for adjusting the contact pressure force 47*a* of the wiper lip 22*a*, 22*a*', 22*a*" on the surface 16*a* is able to be assembled on the wiper arm 20*a*. The adjustment gage 76*a* assembled in the wiper arm 20*a* is shown in FIG. 9. The adjustment gage 76*a* is larger disposed in the wiper arm 20*a*. The adjustment gage 76*a* bears largely on an external wall 72*a* of the wiper arm 20*a* that faces away from the surface 16*a*. The adjustment gage 76*a* is at least partially formed from an element which, at least in a sub-region, has the same shape as the wiper lip 22*a*, 22*a*', 22*a*". For adjusting the spacing 52*a*, the adjustment gage 76*a* instead of the wiper blade 18*a*, 18*a*', 18*a*" can be assembled on the wiper arm 20*a*. Once the spacing 52*a* has been adjusted, the adjustment gage 76*a* can be replaced by the wiper blade 18*a*, 18*a*', 18*a*".

Figure 11:
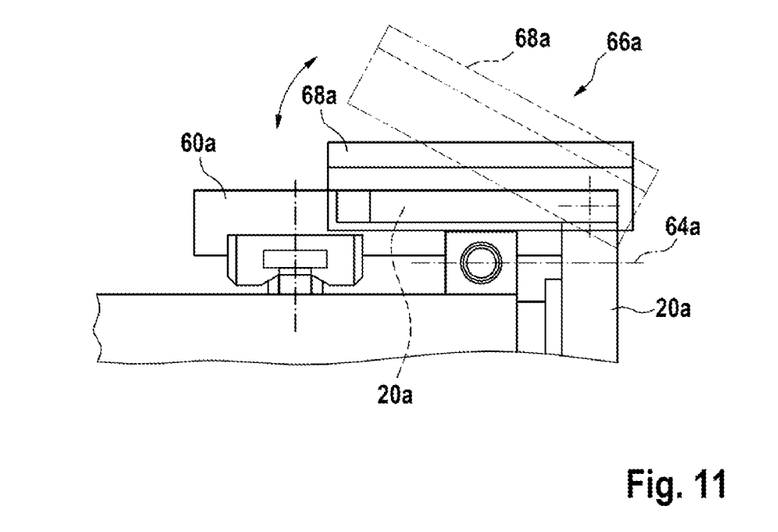
FIG. 11 shows a schematic illustration of a connecting unit of the wiper device in the first exemplary embodiment, as a variant to FIGS. 3 and 10.
Figure 12:
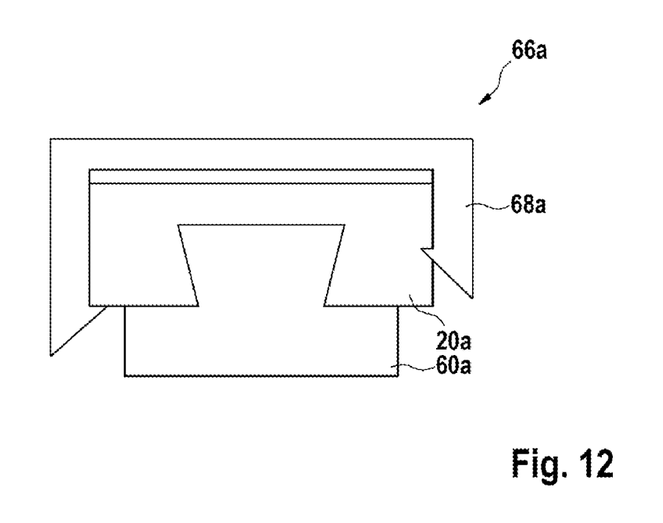
FIG. 12 shows a schematic sectional illustration of the connecting unit.

Alternatively, the wiper device 10*a* by means of the adjustment screw 54*a* can be attached to the carrier element 60*a*. The wiper device 10*a* comprises a connecting unit 66*a* by means of which the wiper arm 20*a* and the wiper arm guide unit 24*a* are releasably connected to one another. The connecting unit 66*a* is configured as a snap-fit closure. The wiper arm 20*a* and the carrier element 60*a*, in a completely assembled state, by means of a connection means 68*a* are connected to one another in a force-fitting and/or form-fitting manner. The connection means 68*a*, proceeding from two sides of the wiper arm 20*a* that face away from one another, is provided for mutually compressing the wiper arm 20*a* and the carrier element 60*a*. The connection means 68*a* latches onto the carrier element 60*a* and presses the carrier element 60*a* against the wiper arm 20*a*. The connection means 68*a* is pivotably mounted on the carrier element 60*a* (cf. FIG. 11 and FIG. 12).

Figure 13:
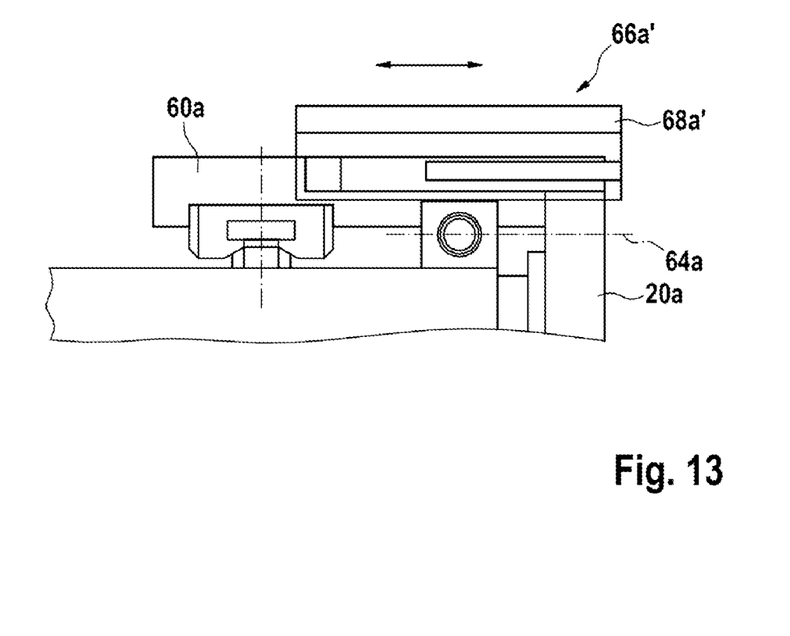
FIG. 13 shows a schematic illustration of an alternative connecting unit of the wiper device in the first exemplary embodiment, as a variant to FIGS. 11 and 12.
Figure 14:
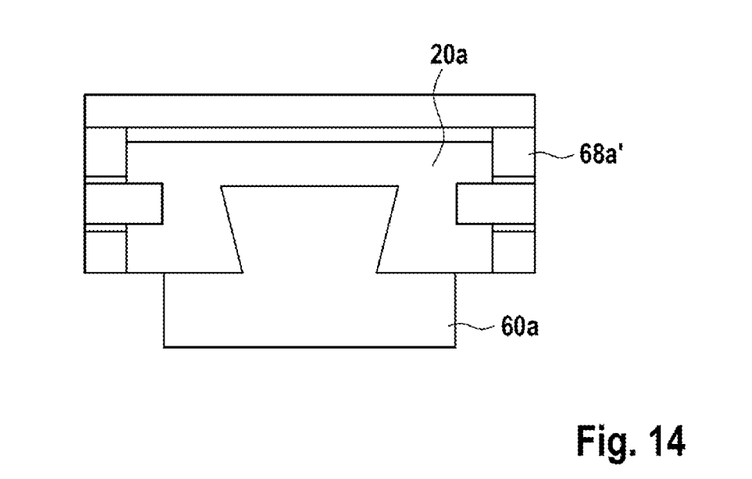
FIG. 14 shows a schematic sectional illustration of the alternative connecting unit.

An alternative connecting unit 66*a*' of the wiper device 10*a* is shown in FIGS. 13 and 14. The connecting unit 66*a*' has a connection means 68*a*' which for fixing a dovetail joint between the wiper arm 20*a* and the carrier element 60*a* engages laterally in the carrier element 60*a*. The connection means 68*a*' in a translatory manner is able to be push-fitted onto the wiper arm 20*a* parallel to the adjustment axis 64*a*. The connection means 68*a*', proceeding from two sides of the wiper arm 20*a* that face away from one another, is provided for mutually compressing the wiper arm 20*a* and the carrier element 60*a*. The connection means 68*a*' latches onto the carrier element 60*a* and presses the carrier element 60*a* against the wiper arm 20*a*.

Figure 15:
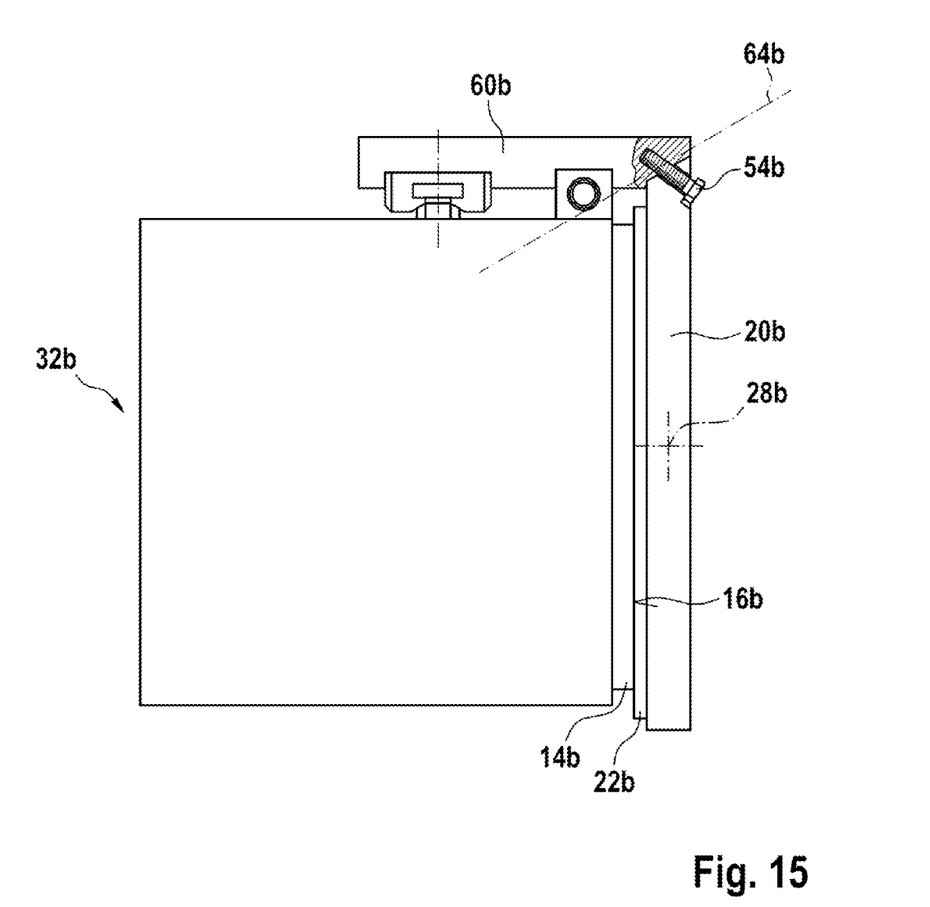
FIG. 15 shows a schematic illustration of a wiper device according to the invention in a second exemplary embodiment.
Figure 16:
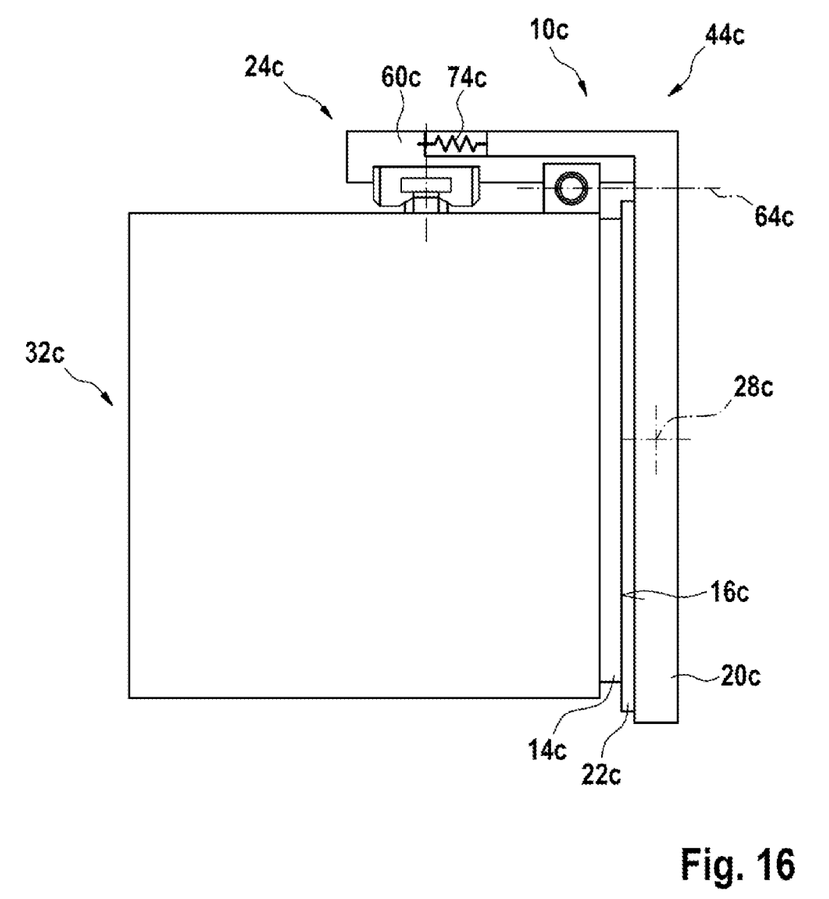
FIG. 16 shows a schematic illustration of a wiper device according to the invention in a third exemplary embodiment.

Two further exemplary embodiments of the invention are shown in each of FIGS. 15 and 16. The descriptions hereunder and the drawings are substantially limited to the differences between the exemplary embodiments, wherein in terms of identically referenced components, in particular in terms of components having the same reference signs, reference may fundamentally also be made to the drawings and/or the description of the other exemplary embodiments, in particular those of FIGS. 1 to 14. In order for the exemplary embodiments to be differentiated, the suffix a is used for the reference signs of the exemplary embodiment in FIGS. 1 to 14. The suffix a is replaced by the suffixes b and c in the exemplary embodiments in FIGS. 15 and 16.

An alternative wiper device 10*b* is shown in FIG. 15. As opposed to the first exemplary embodiment, an adjustment axis 64*b* has a different orientation. The adjustment axis 64*b* is aligned at an angle between 10° and 80°, in particular at an angle of 33°, in relation to a surface 16*b* of the protective element 14*b*. Connection between the wiper arm 20*b* and the carrier element 60*b* can be established as in the first exemplary embodiment.

A further alternative wiper device 10*c* is shown in FIG. 16. The wiper device 10*c* comprises a contact pressure unit 44*c*. As opposed to the preceding exemplary embodiments, the wiper arm 20*c*, in particular in the assembled state, is mounted so as to slide in relation to the carrier element 60c. The wiper arm 20c is connected to the carrier element 60c by way of a spring element 74c of the contact pressure unit 44c. The spring element 74c is connected directly to the wiper arm 20c and to the carrier element 60c. The spring element 74c impinges the wiper arm 20c with a contact pressure force 47c on the surface 16c. The wiper arm 20c, in a translatory manner, is mounted on the carrier element 60c so as to slide along an adjustment axis 64c. The spring element 74c is configured as a tension spring. The spring element 74c is provided to attract the wiper arm 20c along the adjustment axis 64c, preferably toward the carrier element 60c.

What is claimed is:

1. A wiper device having a wiper arm (20c), having at least one wiper blade which is coupled to the wiper arm (20c), wherein the wiper blade extends along a longitudinal axis, wherein the wiper blade includes at least one wiper lip (22c) for wiping a surface (16c) of a protective element (14c) of a sensor device, wherein the wiper device includes a wiper arm guide unit (24c) which is provided for moving the wiper arm (20c) in an at least substantially translatory manner along a guide path, characterized by a rotary joint by means of which the wiper blade is pivotably mounted on the wiper arm (20c) about a rotation axis (28c), wherein the rotation axis is perpendicular to the longitudinal axis and is configured to be parallel to the surface, wherein the wiper arm (20c) is linearly adjustable along an adjustment axis (64c), wherein the wiper device further includes a contact pressure unit (44c) having a spring element (74c) which is provided for generating a contact pressure force (47c) for pressing the wiper lip (22c) onto the surface (16c) of the protective element (14c), wherein the spring element is a tension spring that extends parallel to the adjustment axis (64c) when the wiper lip (22c) is pressed onto the surface (16c).

2. The wiper device according to claim 1, wherein the rotary joint, when viewed along a longitudinal axis of the wiper arm (20c), is disposed so as to be at least substantially in a center of the wiper arm (20c).

3. The wiper device according to claim 1, wherein the wiper arm guide unit (24c) comprises a carrier element (60c) which is coupled to the wiper arm (20c).

4. The wiper device according to claim 3, wherein a longitudinal axis of the carrier element (60c) is angled so as to be at least substantially perpendicular to a longitudinal axis of the wiper arm (20c).

5. The wiper device according to claim 3, wherein the wiper arm (20c) is provided for push-fitting onto the carrier element (60c).

6. The wiper device according to claim 3, wherein the wiper arm (20c) and the carrier element (60c) are coupled to one another by way of a dovetail joint.

7. The wiper device according to claim 1, wherein the adjustment axis (64c) is aligned so as to be at least substantially perpendicular to the surface (16c) of the protective element (14c).

8. The wiper device according to claim 1, wherein the adjustment axis is aligned at an angle between 10 degrees and 80 degrees in relation to the surface of the protective element.

9. A sensor system, having at least one sensor device, which comprises a protective element, and having the wiper device (10c), according to claim 1, which is provided for wiping the surface (16c) of the protective element (14c).

10. A vehicle having at least one sensor system according to claim 9.

11. The sensor system of claim 9, wherein the sensor system is a Lidar system, and wherein the sensor device is a Lidar device.

12. The wiper device according to claim 1, wherein the sensor device is a Lidar device.

13. A wiper device having a wiper arm (20a; 20b; 20c), having at least one wiper blade (18a, 18a', 18a") which is coupled to the wiper arm (20a; 20b; 20c), which comprises at least one wiper lip (22a, 22a', 22a") for wiping a surface (16a; 16b; 16c) of a protective element (14a; 14b; 14c) of a sensor device (12a), and having a wiper arm guide unit (24a) which is provided for moving the wiper arm (20a; 20b; 20c) in an at least substantially translatory manner along a guide path (50a), characterized by a rotary joint (26a) by means of which the wiper blade (18a, 18a', 18a") is pivotably mounted on the wiper arm (20a; 20b; 20c), wherein the wiper arm guide unit (24a) comprises a carrier element (60a; 60b; 60c) which is coupled to the wiper arm (20a; 20b; 20c), and wherein the wiper arm (20a; 20b; 20c) and the carrier element (60a; 60b; 60c) are coupled to one another by way of a dovetail joint.

14. A wiper device having a wiper arm (20a; 20b; 20c), having at least one wiper blade (18a, 18a', 18a") which is coupled to the wiper arm (20a; 20b; 20c), which comprises at least one wiper lip (22a, 22a', 22a") for wiping a surface (16a; 16b; 16c) of a protective element (14a; 14b; 14c) of a sensor device (12a), and having a wiper arm guide unit (24a) which is provided for moving the wiper arm (20a; 20b; 20c) in an at least substantially translatory manner along a guide path (50a), wherein the wiper device includes a rotary joint (26a) by means of which the wiper blade (18a, 18a', 18a") is pivotably mounted on the wiper arm (20a; 20b; 20c), wherein the wiper arm guide unit (24a) comprises a carrier element (60a; 60b; 60c) which is coupled to the wiper arm (20a; 20b; 20c), wherein the wiper arm (20a; 20b; 20c) and the carrier element (60a; 60b; 60c) are coupled together via a connection means (68a'), wherein the wiper arm (20a; 20b; 20c) is linearly adjustable along an adjustment axis (64a; 64b; 64c), wherein the connection means (68a') is configured to move in a translatory manner to be push-fitted onto the wiper arm (20a; 20b; 20c) parallel to the adjustment axis (64a; 64b; 64c).

15. The wiper device of claim 14, wherein the connection means (68a') is latched onto the carrier element (60a; 60b; 60c) and is configured to press the carrier element (60a; 60b; 60c) against the wiper arm (20a; 20b; 20c).

* * * * *